April 26, 1949.   E. J. ABBOTT ET AL   2,468,648
BEARING TESTING DEVICE Filed July 4, 1944   5 Sheets-Sheet 1

April 26, 1949.   E. J. ABBOTT ET AL   2,468,648
BEARING TESTING DEVICE

Filed July 4, 1944   5 Sheets-Sheet 4

INVENTORS
E. J. ABBOTT,
L. W. CHANEY &
E. B. BRAGG
BY Roy A. Plant
ATTORNEY

April 26, 1949.  E. J. ABBOTT ET AL  2,468,648
BEARING TESTING DEVICE

Filed July 4, 1944  5 Sheets-Sheet 5

INVENTORS
E. J. ABBOTT,
L. W. CHANEY &
E. B. BRAGG
BY Roy A. Plant
ATTORNEY

Patented Apr. 26, 1949

2,468,648

UNITED STATES PATENT OFFICE 2,468,648

BEARING TESTING DEVICE

Ernest J. Abbott, Lucian W. Chaney, and Edward B. Bragg, Ann Arbor, Mich., assignors to Physicists Research Company, Ann Arbor, Mich., a corporation of Michigan Application July 4, 1944, Serial No. 543,500

17 Claims. (Cl. 73—70)

The present invention relates primarily to testing apparatus, and in its specific phases to an apparatus for testing and classifying imperfections in ball and roller bearings.

The need of an apparatus for testing and classifying imperfections of bearings, and particularly ball and roller bearings, has long been recognized by the bearing industry. It has been common practice to run bearings on some sort of test stand in an attempt to determine whether a specific bearing was satisfactory for commercial use. One of these procedures involved rotating the inner race of the ball or roller bearing while manually holding the outer race and determining by the feeling of the vibration the quality of the bearing under consideration. There is, of course, no way of calibrating just what an individual feels in making this type of test, and accordingly the same bearing might feel different to him at different times, and the same variation of analysis would occur with the same bearing and different operators. Another system which has been tried involves the mounting of a microphone near a bearing which is being tested, normally under load, and then listening to the sound after proper amplification. This again provides no accurate means of measurement since the determination of quality depends entirely upon the hearing of the party conducting the test, and this in turn will vary from time to time as well as with different operators. Tests according to that system also involve the difficulty of the microphone picking up extraneous noises and amplifying them along with the actual bearing noises.

Diaphragm devices have also been proposed for this purpose, and such devices commonly have the diaphragm connected to a voltage generating device which is actuated due to the movement of the diaphragm. This type of system has proven unsatisfactory due to the resonance of the system, variation in the weight of the components to be tested, and due to the fact that no satisfactory calibration of the system is possible. In order to get sufficient actuation of the diaphragm for this purpose it has been universal practice to mount the diaphragm so that it will move due to axial vibrations of the component being tested.

Seismic type pick-ups have also been proposed for this purpose. This type of pick-up has a floating component and a driven component wherein the relative movement of one to the other is utilized to generate a voltage which can be used for indicating vibration. This type of apparatus has several difficulties, in the first place it picks up external vibrations as well as those of the component being tested. It is also difficult, if not impossible, to calibrate this type of apparatus throughout its full range of operation. The reasons for this are that there are resonance points inherent in the apparatus, and that it works best at low frequencies while the frequency response for the higher frequencies falls off rapidly, thus giving undue weight to the low frequency components and providing a nonlinear response. It was with a view to the above difficulties and shortcomings, as well as the need of a satisfactory testing apparatus, that the present invention was devised.

Accordingly, among the objects of the present invention is the provision of an apparatus suitable for use in testing and classifying imperfections in components wherein the radial and circumferential dimensions of the geometrical irregularities of the component parts of the bearing are used to actuate the measuring and classifying apparatus.

Another object is to provide an apparatus which can be the effects of the imperfections of a component to be tested, such measurements being based on the radial and circumferential dimensions of the geometrical irregularities of the component parts of the bearing. It has been found useful to calibrate the instrument in terms of the ratio of the radial dimensions to the circumferential dimensions of the surface irregularities. Mathematically, this ratio is the angular derivative of the radial displacement. For convenience, a linear unit, namely, the microinch, has been used for the radial dimensions, and an angular unit, namely, the radian, has been used for the circumferential dimensions. As will be described presently, it is also necessary to define the range of wave length of circumferential irregularities included in the measurement. The unit used is the log to base 2 of the ratio of the longest wave length to the shortest wave length and is expressed in octaves. Accordingly, the measurement is made in definite units of microinches per radian per octave, which for brevity we have chosen to call an Anderon.

Another object is to provide a testing apparatus which is substantially free from the effects of external vibrations as well as resonance points.

Another object is to provide a testing apparatus which is substantially unaffected by extraneous magnetic fields.

Another object is to provide an apparatus for testing ball and roller bearings wherein actual radial movement of the outer race is measured in linear manner.

A further object is to analyze the radial movement of components under test in a plurality of ranges of wave lengths produced by the geometrical irregularities of the components.

Another object is to provide a testing apparatus which utilizes a combination of meters and a loud speaker for picking out characteristic effects of imperfections of components being tested.

Another object is to provide an apparatus which may be used to graphically record the effects of imperfections of components being tested.

A still further object is to provide an apparatus which makes possible the quick testing of ball or roller bearings and which is readily changeable so as to be substantially independent of the size and type of bearing being tested.

Further objects and advantages of the present invention will appear as the description proceeds.

To the accomplishment of the foregoing and related ends, the invention, then, consists of the means hereinafter fully described and particularly pointed out in the claims, the annexed drawings and the following description setting forth in detail certain means for carrying out the invention, such disclosed means ilustrating, however, but several of various ways in which the principle of the invention may be used.

In the annexed drawings:

Figure 8 shows a full view of the apparatus illustrated in Figure 7 as seen from the right hand end of the same.

The actual assembly of the testing apparatus which is being manufactured in accordance with the present invention is sold under the trade mark name of "Anderometer" and for convenience of description the assembly of the present invention will be referred to as an "Anderometer."

Figure 1:
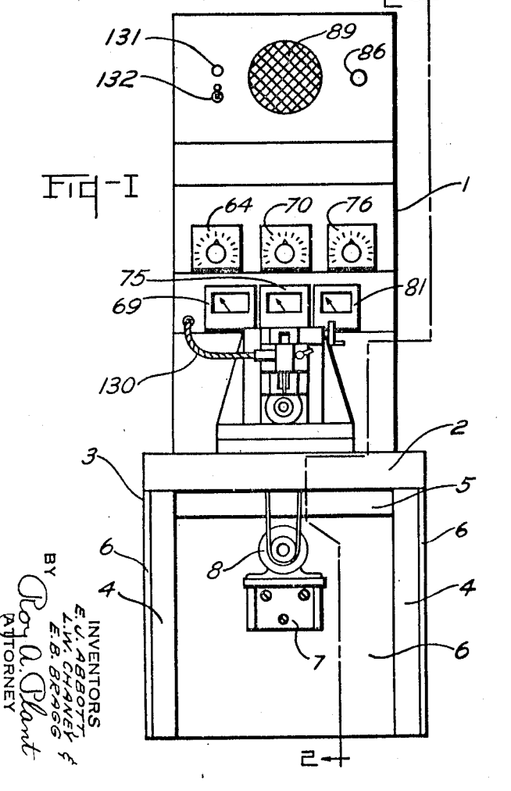
Figure 1 shows a front view of a preferred form of apparatus embodying the present invention.
Figure 2:
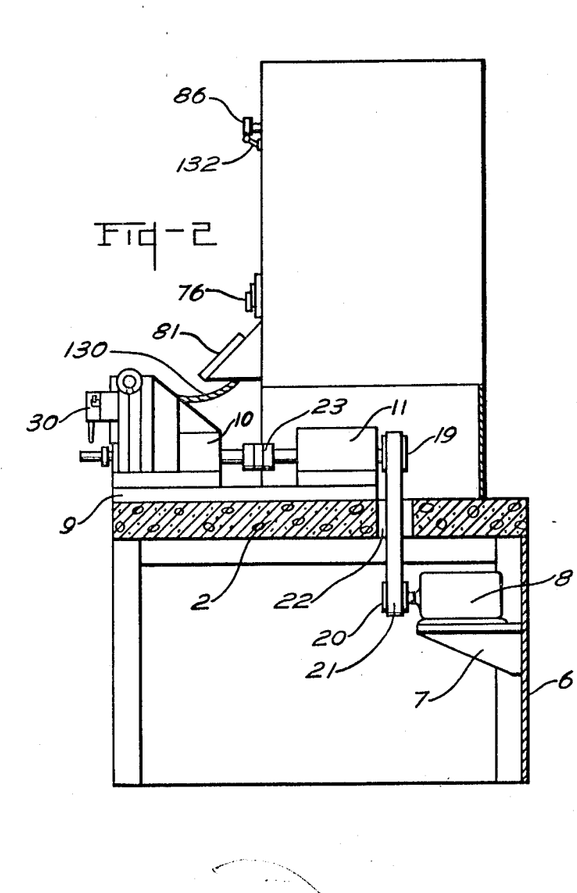
Figure 2 shows a partially sectioned side view of the apparatus illustrated in Figure 1, as taken along line 2—2 thereof looking in the direction of the arrows.

Referring more particularly to Figures 1 and 2 of the drawings the Anderometer assembly 1 is shown as mounted on a concrete slab 2. The invention, however, is not limited to the use of a concrete slab since any suitable mounting which has sufficient mass or stability to largely or substantially eliminate vibration effects may be used in like manner. This concrete slab, for convenience, is mounted on a suitable table-like assembly 3 which may be provided with legs 4 and top frame members 5. This whole table assembly may be encased with plywood panels 6 for appearance and rigidity. One of the panels, for instance the back panel, may have a motor mounting bracket 7 fastened thereto with motor 8 mounted for a purpose to be hereinafter described.

Figures 3, 4, 6:
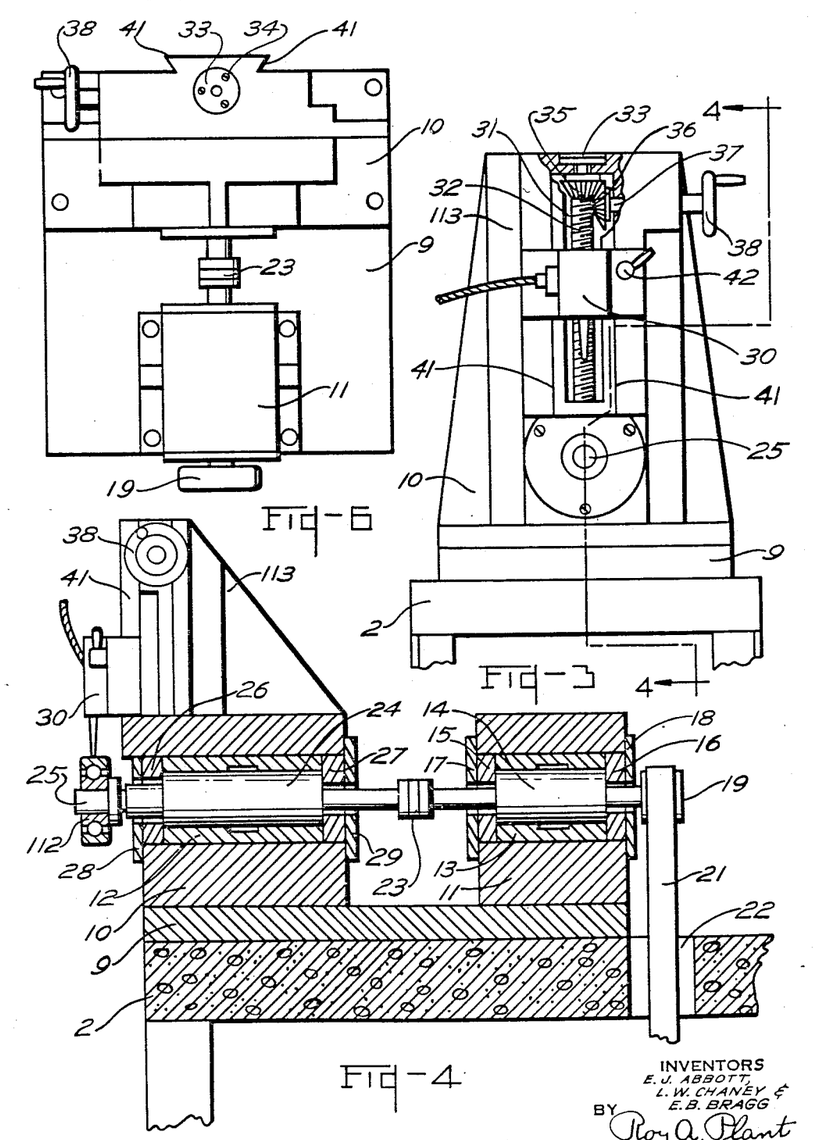
Figure 3 shows a partially sectioned front view of a portion of the apparatus.
Figure 4 is a fragmentary sectional view as taken substantially along the line 4—4 of Figure 3 looking in the direction of the arrows.
Figure 6 shows a top view of the main and jack shaft housings mounted on a base plate.

In Figures 3 and 4 of the drawings a cast iron base plate 9 is mounted on the concrete slab 2. This base plate is machined on both top and bottom faces and the top face is preferably ground to give an accurate mounting surface. Fastened on this base plate in conventional manner is a main shaft housing 10 and a jack shaft housing 11. These two housings also have their bases machined and preferably ground. Both of these housings are longitudinally bored in alignment and provided with bearing sleeves 12 and 13 respectively. These bearing sleeves are in turn preferably bored, reamed, and honed in alignment.

A jack shaft 14 is mounted in bearing sleeve 13 of jack shaft housing 11 and held against end-wise movement by means of thrust bearings 15 and 16 which in turn are held in place by means of cover plates 17 and 18. One end of jack shaft 14 is provided with pulley 19 which aligns with motor pulley 20, Figure 2, and is connected thereto by means of belt 21 or equivalent. A suitable opening 22 is provided through concrete slab 2 for clearance of the belt 21 under conditions of use. The other end of jack shaft 14 is connected by means of a flexible coupling 23 to the adjacent end of main shaft 24. The opposite end of this main shaft is preferably concentrically taper bored and ground for the reception of an adaptor 25 as is typically shown in Figure 5. This main shaft is held against end-wise movement by means of thrust bearings 26 and 27 which in turn are respectively held in place by means of cover plates 28 and 29. A ball bearing 112 is sectionally shown in place in Figure 4 for ease of understanding the operation of the present invention.

The main shaft housing 10 is preferably constructed with an upward extension 113 with bracing for rigidity. On the front face of the upward extension are machined vertical ways 41 on which is mounted a converter assembly 30. A vertical recess 31 is machined between these ways and in this vertical recess is vertically mounted a converter adjustment screw 32. The lower end of this adjustment screw is held in place in conventional manner (not shown) while the upper end is engaged by a thrust bearing 33 which may be fastened in place with screws 34, Figure 6. Mounted on the converter adjustment screw 32 is a small bevel gear 35 which meshes with bevel gear 36 on shaft 37 which extends out through upward extension 113 and is rotated by means of hand wheel 38.

Figures 6, 7:
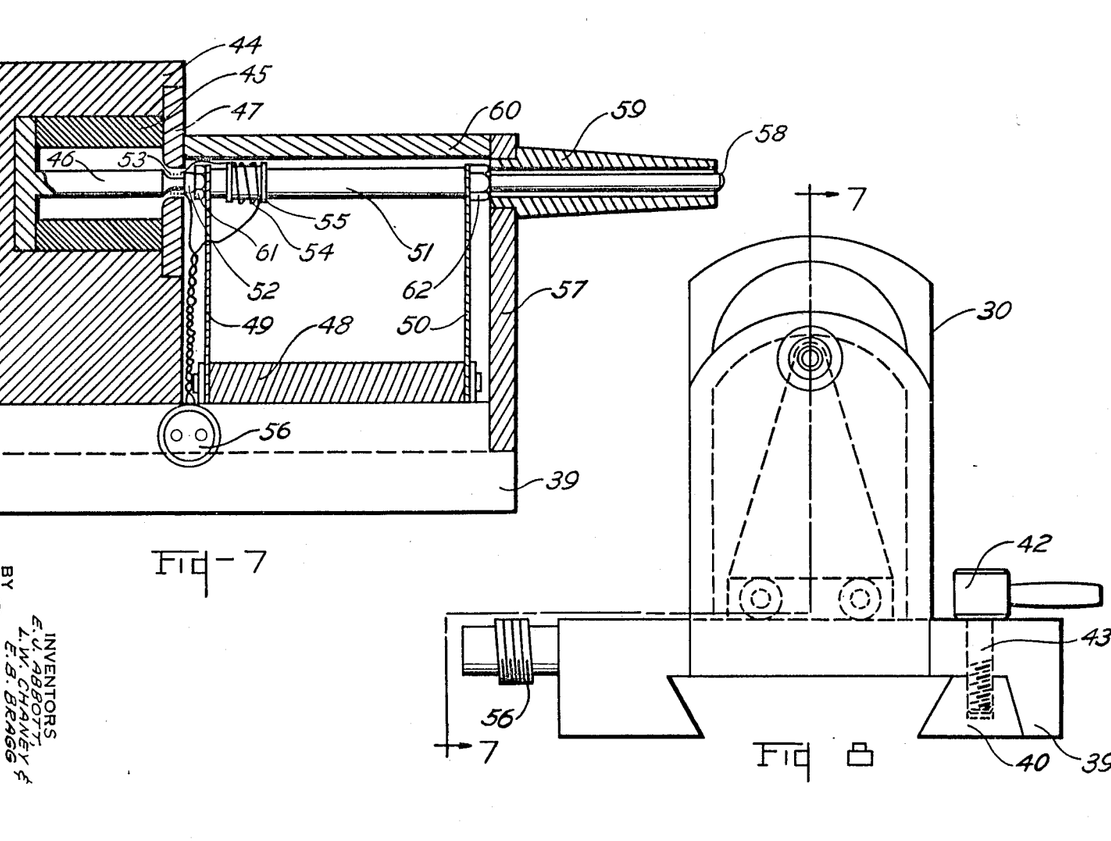
Figure 7 shows a partially sectioned assembly view of a preferred form of the converter unit used in the apparatus illustrated in Figures 1 and 2, all as taken substantially along line 7—7 of Figure 8 looking in the direction of the arrows.

The converter assembly 30, as shown in Figures 7 and 8, has a dove-tailed slide 39 with gib 40 for engaging ways 41, Figures 3 and 4. Handle 42 has an extending threaded portion 43 which engages gib 40 for locking the converter assembly in place after suitable adjustment. Mounted on dove-tailed slide 39 is a non-magnetic magnet block 44 which is counter-bored and fitted with a permanent magnet 45. This permanent magnet has a center pole piece 46. A magnetic magnet cover plate 47 with an opening concentric with and larger than the end of center pole piece 46 is used for holding permanent magnet 45 in the magnet block 44. This cover plate also completes the magnetic circuit in a manner permitting flow of magnetic flux across the gap between the plate and the center pole piece 46. A spring mounting block 48, which is preferably integral with dove-tailed slide 39, carries springs 49 and 50. The movable end of these springs carries a contact rod 51. As viewed in Figure 7 the left end of this contact rod carries a hollow coil support member 52 on which is mounted a coil 53 which is concentric with center pole piece 46 and freely movable in the gap between that pole piece and magnet cover plate 47. A neutralizing coil 54 wound on coil form 55, which in turn is preferably mounted on the left end of contact rod 51 between springs 49 and 50, is preferably used to neutralize the effect of extraneous magnetic fields. When this neutralizing coil is thus used it is connected in series opposition to coil 53 so that magnetic flux from extraneous magnetic fields will generate substantially equal and opposing voltages in the two coils and thus be neutralized. The lead wires from these coils terminate at cable connector 56. Contact rod 51 extends through end plate 57 and is preferably provided with a Carboloy tip 58 of suitable radius. A radius which is suitable for most uses is $\frac{3}{32}''$. Guard member 59 is used to protect the extending projection of this contact rod and is preferably of a length a little shorter than contact rod 51 under normal conditions of operation. A spring assembly cover 60 is preferably used to protect the springs and coils from mechanical damage and foreign matter. The contact rod 51 is fastened to springs 49 and 50 by means of nuts 61 and 62, the latter of these acting as a stop which upon contact with end plate 57 acts to prevent the contact rod 51 from normally extending more than a prescribed amount out of the end of guard member 59. A conventional crystal pick-up may be used in place of coil 53 and magnet 45, and the showing of these voltage generating elements is intended to also diagrammatically illustrate the crystal pick-up type of voltage generator.

Figures 5, 9, 10:
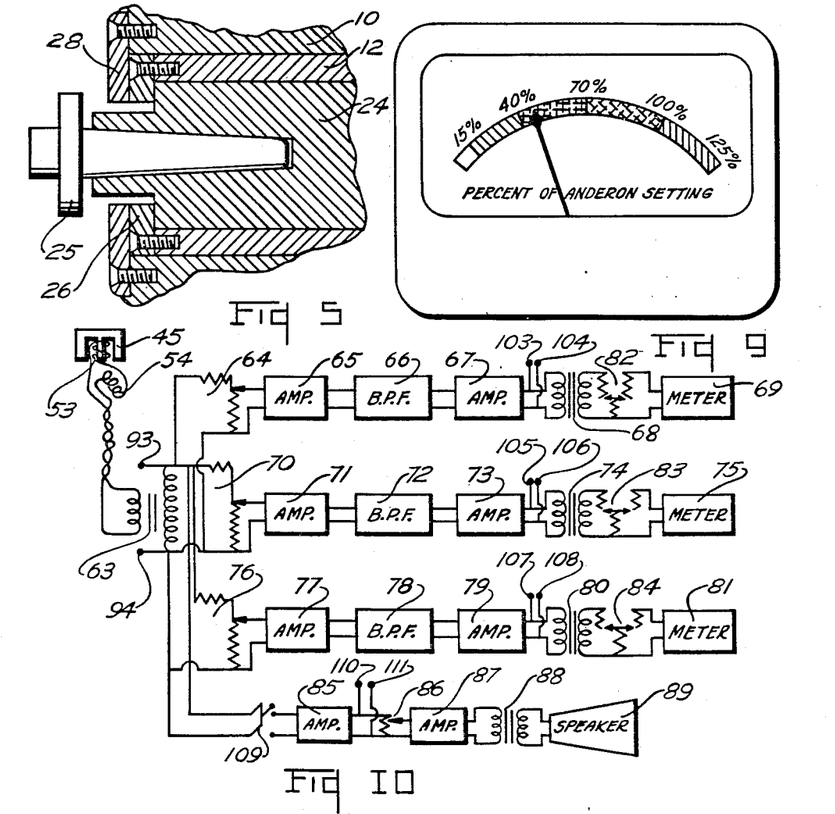
Figure 5 shows an enlarged fragmentary sectional view illustrating the installation of an adaptor member in the main shaft.
Figure 9 shows a front view of a preferred form of typical meter and dial used in the apparatus illustrated in Figures 1 and 2.
Figure 10 shows a schematic wiring diagram of a preferred form of the present invention.

Referring to the wiring diagram shown in Figure 10, the permanent magnet 45 is shown with moving coil 53 connected in series opposition to neutralizing coil 54. The leads from these two coils are connected to the primary of transformer 63. Two or more band pass amplifier systems may be connected to the secondary of transformer 63. For convenience of illustration and description of the present invention three of these band pass systems have been illustrated along with a loud speaker amplifier circuit. Each one of these band pass amplifier systems is connected to the secondary of transformer 63 by means of an unbalanced potentiometer type attenuator which is graduated in calibrated steps. While the invention will be described by way of example in terms of using three band pass amplifier circuits, it is to be understood that the invention is not limited to that number of circuits.

A typical system of this type may utilize a low band pass of 50 to 350 cycles, a medium band pass of 350 to 1,800 cycles, and a high band pass of 1,800 to 10,000 cycles. It is to be understood, of course, that the invention is not limited to these specific frequency ranges.

The low frequency band amplifier attenuator 64 is connected on one side to the secondary of transformer 63 and on the other side to amplifier 65, the output of which is connected to band pass filter 66, and its output is connected to output amplifier 67. The output of this amplifier is delivered to transformer 68 and then to A. C. meter 69. The medium frequency band amplifier also receives its input voltage from the secondary of transformer 63 and transmits it through attenuator 70, amplifier 71, band pass filter 72, amplifier 73, and transformer 74 to A. C. meter 75. The high frequency band amplifier in turn receives its input voltage from the secondary of transformer 63, such voltage being delivered through attenuator 76, amplifier 77, band pass filter 78, amplifier 79, and transformer 80 to A. C. meter 81.

In order to adjust the output of the amplifier before delivery to the meter it is preferable to supply T-pads in each of the circuits ahead of the meters in order to facilitate calibration of the circuits and to compensate for differences in sensitivity of converter units, and differences in widths of the frequency bands passed by the filters. These T-pads, which may be defined as constant impedance attenuators, are indicated in Figure 10 by the numerals 82, 83, and 84.

If desired the visual readings on the meters may be supplemented by means of hearing wherein a loud speaker system is connected to the secondary of transformer 63 and consists of amplifier 85, volume control 86, amplifier 87, and transformer 88, the output from which actuates loud speaker 89. This loud speaker circuit is of supplemental aid to the visual studying of the results shown on the meters, in that it audibly brings out transients and characteristics which are too small, or of too short a duration, to be shown by the meters.

Where an audible check of the individual bands is desired, this may be accomplished by opening switch 109, Figure 10, and then if the low frequency band is to be studied, terminals 110 and 111 may be connected to terminals 103 and 104. If the intermediate frequency band or the high frequency band is to be audibly checked in the place of the low frequency band, then instead of connecting terminals 110 and 111 to terminals 103 and 104, they will be connected to terminals 105 and 106, or 107 and 108, as the case may be. This makes the system very flexible, and permits more detailed study to be made.

Figure 11:
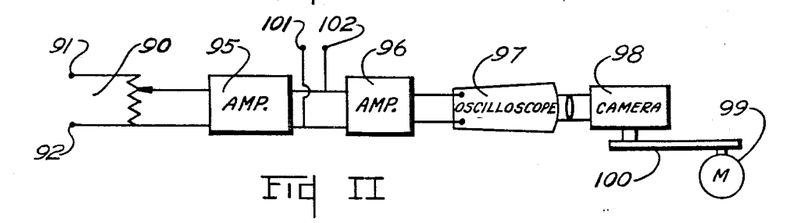
Figure 11 shows a schematic wiring diagram for use in combination with the wiring diagram of Figure 10 whereby graphic recording of imperfections of a component can be made.

In some cases it may be desirable to make a permanent record of the effects of the geometrical irregularities of the bearing being tested, and in order to perform this operation attenuator 90, Figure 11, may be connected by means of its input terminals 91 and 92 to output terminals 93 and 94 of the secondary of transformer 63, Figure 10. The output of attenuator 90 is delivered to an amplifier 95, and this amplifier in turn is connected to a second amplifier 96 the output of which is delivered to an oscilloscope 97 which is connected to a camera assembly 98 carrying film in conventional manner, and which can be driven by means of a motor 99 with a suitable speed reducing drive 100.

Where a recording is to be made of a single band, terminals 91 and 92 are disconnected from output terminals 93 and 94 of transformer 63, Figure 10, and then terminals 101 and 102, Figure 11 may be connected to terminals 103 and 104 of the low band pass circuit of Figure 10. This will result in a record being made of the output of the low frequency amplifier circuit. If the record is to be made of the intermediate frequency band then the terminals 101 and 102 will be connected to output terminals 105 and 106 of the intermediate band amplifier circuit. On the other hand if the high frequency band information is to be recorded, terminals 101 and 102 will be connected to the terminals 107 and 108 of the high frequency band amplifier circuit.

Figures 12, 13:
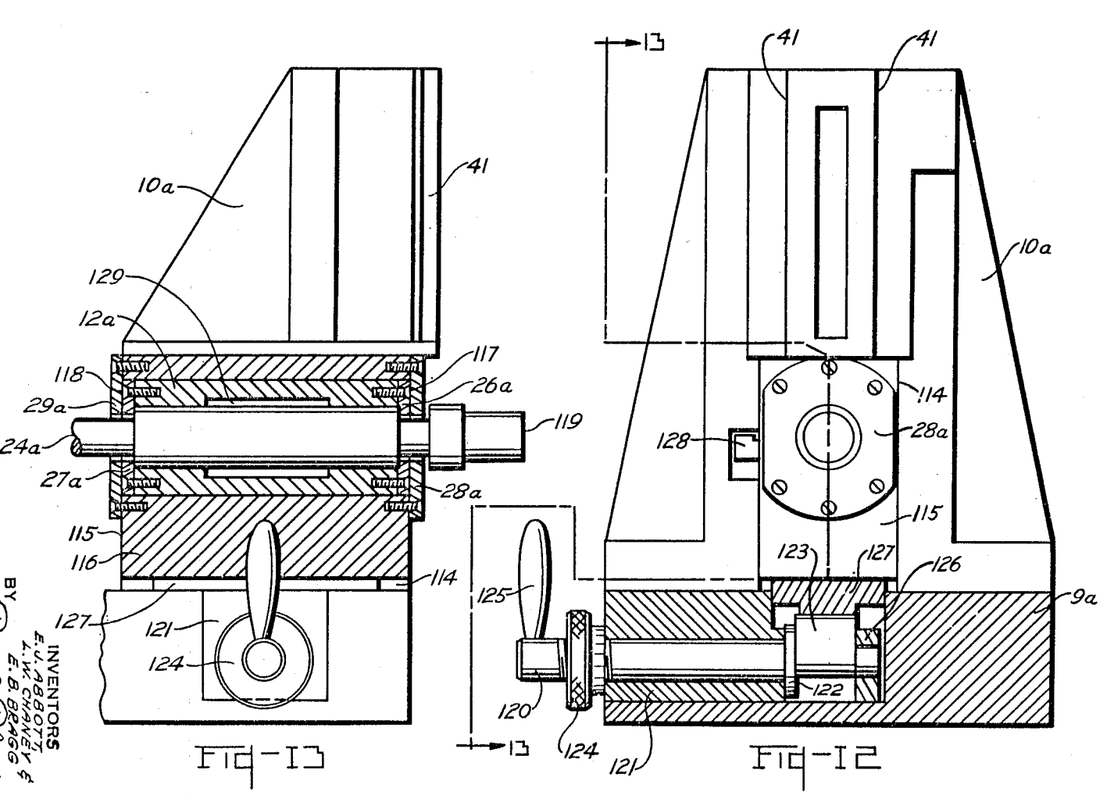
Figure 12 shows a partially assembled and partially sectioned fragmentary view of a modified form of the main shaft assembly of the present invention.
Figure 13 shows a partially sectioned side view of the apparatus shown in Figure 12 all as viewed along line 13—13 thereof looking in the direction of the arrows.

In place of using interchangeable tapered adapters 25 as illustrated in Figure 5, an interchangeable cartridge system may be used, and one form of the same is typically illustrated in Figures 12 and 13. Here the main shaft housing 10a is provided with a substantially rectangular recess 114 which extends down to base plate 9a. Interchangeable cartridge assembly 115 is adapted to fit the recess 114 and be clamped against the top of the same under conditions of use. This cartridge in preferred form will consist of a body member 116 which is longitudinally bored and preferably ground so that its centerline is in alignment with the centerline of jack shaft 14 of the Anderometer assembly. Bushing 12a is then press fit into the bore of body member 116, following which it is bored and preferably honed in alignment with the centerline of the jack shaft. Main shaft 24a is machined and preferably ground to fit the bore of bushing 12a with very close tolerances. Thrust bearings 26a and 27a, conventionally fastened to bushing 12a as by means of screws 117 and 118, act to hold main shaft 24a in place. Cover plates 28a and 29a act to hold the bushing and thrust bearings in place in main shaft housing 10a. The left hand end of main shaft 24a, as viewed in Figure 13, will carry a separable portion of coupling 23, Figure 4, while the right hand end of the main shaft carries a fixed adapter 119 ground to very close tolerances while rotated with main shaft 24a. In a preferred construction the cartridge assemblies will be identical, with the exception of varying sizes of the fixed adapter 119. This adapter is preferably a separate part which is fastened on main shaft 24a in conventional manner and finished after thrust bearing 26a and cover plate 28a have been mounted and fastened in place. In order to lubricate the main shaft, a suitable oiler 128 may be installed as shown in Figure 12, so as to feed oil into relief 129 of bushing 12a.

In order to clamp the cartridge 115 firmly in place in main shaft housing 10a, a clamping device may be incorporated in base plate 9a. One preferred form of this clamping device is illustrated in Figures 12 and 13 where clamping shaft 120 is shown as passing through a suitable opening in block 121, the latter being held in place in base plate 9a in conventional manner. Clamping shaft 120 is provided with a shoulder member 122, an eccentric 123, lock nut 124, and handle 125. The inner end of clamping shaft 120 is adapted to fit a suitable pillow block type of bearing 126 which is conventionally held in place. Operated by eccentric 123 is a shoe member 127 which is adapted to contact the under face of cartridge 115 upon suitable rotation of shaft 120 and to force the cartridge upward to its uppermost position. With the cartridge in that position the tightening of lock nut 124 will lock the whole assembly in operating position.

In use the apparatus is connected to a suitable source of electricity (not shown) with the main shaft driven at a suitable speed such as 1800 R. P. M., although the invention is not limited to that speed and satisfactory operation has been had at speeds ranging from 1000 to 8000 R. P. M. While main shaft 24 is being rotated, a ball bearing 112, or the like, is placed on adapter 25, which rotates the inner race of the ball bearing while the outer is held stationary, for instance by the test operator. The converter assembly 30 is then adjusted down until tip 58 of contact rod 51 is partially depressed into guard member 59. Under these conditions any radial motions produced by the geometrical irregularities of bearing 112 will cause contact rod 51 to move endwise and likewise carry coil 53 back and forth in the magnetic flux flow of permanent magnet 45. The voltage thus produced due to the movement of the coil is a corresponding alternating voltage which is conducted by means of electric cable 130 to the primary of transformer 63. The secondary of this transformer is connected to one or more electric circuits, at least part of which terminate in a conventional alternating current meter and one of which may be in the form of a loud speaker circuit. These meters, one of which is typically illustrated in Figure 9, read an average value (usually root mean square) and may be calibrated in per cent of the Anderon setting, and the scale may be colored in different ranges for ease of quick visual reading of the characteristics of the particular bearing or part being tested. Where the appartaus is arranged with band pass filters and the low, medium, and high frequency bands are connected to corresponding meters, different characteristics of the part being tested can be read simultaneously on the respective meters, and a loud speaker can be simultaneously used to audibly indicate transients too small to be singled out and registered on the meters. A pilot light 131 and an on and off switch 132 for the loud speaker may be utilized for convenience of operating the apparatus.

Other modes of applying the principle of our invention may be employed instead of those explained, change being made as regards the mechanism herein disclosed, provided the means stated by any of the following claims or the equivalent of such stated means be employed.

We therefore particularly point out and distinctly claim as our invention:

1. An instrument for rating the quality of antifriction bearings having inner and outer races, which comprises means for supporting a bearing and rotatably mounting one of its races, means for rotating said supporting means at substantially uniform speed, a converter mechanism which has a normally stationary portion, means for rigidly maintaining the axis of rotation of said race in fixed position relative to the normally stationary portion of said converter mechanism, said converter mechanism having a member in contact with the other race of said bearing, and restricted in its movement to motions substantially radial to said axis of rotation of said antifriction bearing, means for converting said radial motions of said moving converter member into corresponding electric voltages, electric wave filters for dividing said electric voltages into at least two different bands of predetermined frequency ranges corresponding to predetermined ranges of wave lengths of the surface irregularities of the component parts of said anti-friction bearing, and an electric circuit means for indicating the output of each of said wave filters.

2. An instrument for rating the quality of anti-friction bearings as set forth in claim 1, wherein said means for converting radial motions of said moving converter member into corresponding electric voltages comprises a permanent magnet with a pole gap, and an insulated coil of wire freely movable in said pole gap, said permanent magnet and said coil being movable relative to each other in accordance with movements of said converter mechanism movable member which contacts said bearing race.

3. An instrument for rating the quality of anti-friction bearings as set forth in claim 1, wherein said means for converting radial motions of said moving converter member into corresponding electric voltages comprises a permanent magnet with a pole gap, said permanent magnet being mounted in the normally stationary portion of said converter mechanism, and an insulated coil of wire carried by said converter mechanism movable member which contacts said bearing race, said coil being freely movable in the pole gap of said permanent magnet.

4. An instrument for rating the quality of anti-friction bearings having inner and outer races, which comprises means for supporting a bearing and rotatably mounting one of its races, means for rotating said supporting means at substantially uniform speed, a converter mechanism which has a normally stationary portion, means for rigidly maintaining the axis of rotation of said race in fixed position relative to the normally stationary portion of said converter mechanism, said converter mechanism having a member in contact with the other race of said bearing, and restricted in its movement to motions substantially radial to said axis of rotation of said anti-friction bearing, means for varying the distance of said converter from said axis of rotation of said race, means for converting said radial motions of said moving converter member into corresponding electric voltages, electric wave filters for dividing said electric voltages into at least two different bands of predetermined frequency ranges corresponding to predetermined ranges of wave lengths of the surface irregularities of the component parts of said anti-friction bearing, and an electric circuit means for indicating the output of each of said wave filters.

5. An instrument for rating the quality of anti-friction bearings having inner and outer races, which comprises means for supporting a bearing and rotatably mounting one of its races, means for rotating said supporting means at substantially uniform speed, a converter mechanism which has a normally stationary portion, means for rigidly maintaining the axis of rotation of said race in fixed position relative to the normally stationary portion of said converter mechanism, said converter mechanism having a member in contact with the other race of said bearing, and restricted in its movement to motions substantially radial to said axis of rotation of said anti-friction bearing, means for converting said radial motions of said moving converter member into corresponding electric voltages, electric wave filters for dividing said electric voltages into at least two different bands of predetermined frequency ranges corresponding to predetermined ranges of wave lengths of the surface irregularities of the component parts of said anti-friction bearing, an electric circuit means for indicating the output of each of said wave filters, another electric circuit in parallel with the input of said wave filter including circuits and which also receives the electric voltage output of said converter mechanism, which other circuit includes an amplifier, and a loud speaker connected to said amplifier.

6. An instrument for rating the quality of anti-friction bearings having inner and outer races, which comprises means for supporting a bearing and rotatably mounting one of its races, means for rotating said supporting means at substantially uniform speed, a converter mechanism which has a normally stationary portion, means for rigidly maintaining the axis of rotation of said race in fixed position relative to the normally stationary portion of said converter mechanism, said converter mechanism having a member in contact with the other race of said bearing, and restricted in its movement to motions substantially radial to said axis of rotation of said anti-friction bearing, means for converting said radial motions of said moving converter member into corresponding electric voltages, electric wave filters for dividing said electric voltages into at least two different bands of predetermined frequency ranges corresponding to predetermined ranges of wave lengths of the surface irregularities of the component parts of said anti-friction bearing, an electric amplifier for each of said frequency range bands, and separate electric circuit means for indicating the output of each of said amplifiers.

7. An instrument for rating the quality of anti-friction bearings having inner and outer races, which comprises means for supporting a bearing and rotatably mounting one of its races, means for rotating said supporting means at substantially uniform speed, a converter mechanism which has a normally stationary portion, means for rigidly maintaining the axis of rotation of said race in fixed position relative to the normally stationary portion of said converter mechanism, said converter mechanism having a member in contact with the other race of said bearing, and restricted in its movement to motions substantially radial to said axis of rotation of said anti-friction bearing, means for converting said radial motions of said moving converter member into corresponding electric voltages, electric wave filters for dividing said electric voltages into at least two different bands of predetermined frequency ranges corresponding to predetermined ranges of wave lengths of the surface irregularities of the component parts of said anti-friction bearing, an electric circuit means for indicating the output of each of said wave filters, an electric amplifier for each of said frequency range bands, and separate electric circuit means for indicating the output of each of said amplifiers, said indicating means including an alternating current meter calibrated in terms of the average magnitude of the angular derivative of the radial displacements for the wave length band determined by its wave filter.

8. An instrument for rating the quality of anti-friction bearings having inner and outer races, which comprises means for supporting a bearing and rotatably mounting one of its races, means for rotating said supporting means at substantially uniform speed, a converter mechanism which has a normally stationary portion, means for rigidly maintaining the axis of rotation of said race in fixed position relative to the normally stationary portion of said converter mechanism, said converter mechanism having a member in contact with the other race of said bearing, and restricted in its movement to motions substantially radial to said axis of rotation of said anti-friction bearing, means for converting said radial motions of said moving converter member into corresponding electric voltages, a transformer, electrical connections between said converter and the primary of said transformer, electric wave filters connected to the secondary of said transformer for dividing said electric voltages into at least two different bands of predetermined frequency ranges corresponding to predetermined ranges of wave lengths of the surface irregularities of the component parts of said anti-friction bearing, electric circuit means for indicating the output of each of said wave filters, another electric circuit connected to the secondary of said transformer and in parallel with the input of said wave filter including circuits, said other electric circuit including an amplifier for receiving the electric voltage from said transformer secondary, and a loud speaker connected to said amplifier.

9. An instrument for rating the quality of anti-friction bearings having inner and outer races, which comprises means for supporting a bearing and rotatably mounting one of its races, means for rotating said supporting means at substantially uniform speed, a converter mechanism which has a normally stationary portion, means for rigidly maintaining the axis of rotation of said race in fixed position relative to the normally stationary portion of said converter mechanism, said converter mechanism having a member in contact with the other race of said bearing, and restricted in its movement to motions substantially radial to said axis of rotation of said anti-friction bearing, means for varying the distance of said converter from said axis of rotation of said race, means for converting said radial motions of said moving converter member into corresponding electric voltages, a transformer, electrical connections between said converter and the primary of said transformer, electric wave filters connected to the secondary of said transformer for dividing said electric voltages into at least two different bands of predetermined frequency ranges corresponding to predetermined ranges of wave lengths of the surface irregularities of the component parts of said anti-friction bearing, an electric amplifier for each of said frequency range bands, and separate electric circuit means for indicating the output of each of said amplifiers.

10. An instrument for rating the quality of anti-friction bearings having inner and outer races, which comprises means for supporting a bearing and rotatably mounting one of its races, means for rotating said supporting means at substantially uniform speed, a converter mechanism which has a normally stationary portion, means for rigidly maintaining the axis of rotation of said race in fixed position relative to the normally stationary portion of said converter mechanism, said converter mechanism having a member in contact with the other race of said bearing, and restricted in its movement to motions substantially radial to said axis of rotation of said anti-friction bearing, means for varying the distance of said converter from said axis of rotation of said race, means for converting said radial motions of said moving converter member into corresponding electric voltages, said last named means comprising a permanent magnet with a pole gap, said permanent magnet being mounted in the normally stationary portion of said converter mechanism, and an insulated coil of wire carried by said converter mechanism movable member which contacts said bearing race, said coil being freely movable in the pole gap of said permanent magnet, a transformer, electrical connections between said coil of said converter member and the primary of said transformer, electric wave filters connected to the secondary of said transformer for dividing said electric voltages into at least two different bands of predetermined frequency ranges corresponding to predetermined ranges of wave lengths of the surface irregularities of the component parts of said anti-friction bearing, an electric amplifier for each of said frequency range bands, and separate electric circuit means for indicating the output of each of said amplifiers.

11. An instrument for rating the quality of anti-friction bearings having inner and outer races, which comprises means for supporting a bearing and rotatably mounting one of its races, means for rotating said supporting means at substantially uniform speed, a converter mechanism which has a normally stationary portion, means for rigidly maintaining said axis of rotation of said race in fixed position relative to the normally stationary portion of said converted mechanism, said converter mechanism having a member in contact with the other race of said bearing, and restricted in its movement to motions substantially radial to said axis of rotation of said anti-friction bearing, means for varying the distance of said converter from said axis of rotation of said race, means for converting said radial motions of said moving converter member into corresponding electric voltages, electric wave filters for dividing said electric voltages into at least two different measurement bands of predetermined frequency ranges corresponding to predetermined ranges of wave lengths of the surface irregularities of the component parts of said anti-friction bearing, attenuator circuits for applying selected fractions of said converter output voltages to said measurement bands, an electric amplifier for each of said measurement bands, separate electric circuit means for indicating the output of each of said amplifiers, another electric amplifier connected to the output of said converter mechanism, and a loud speaker connected to said amplifier.

12. An instrument for rating the quality of anti-friction bearings as set forth in claim 11, wherein there are three different bands of predetermined frequency ranges, and wherein said means for converting radial motions of said moving converter member into corresponding electric voltages comprises a permanent magnet with a pole gap, and an insulated coil of wire freely movable in said pole gap, said permanent magnet and said coil being movable relative to each other in accordance with movements of said converter mechanism movable member which contacts said bearing race.

13. An instrument for rating the quality of anti-friction bearings as set forth in claim 11, wherein there are three different bands of predetermined frequency ranges, and wherein said means for converting radial motions of said moving converter member into corresponding electric voltages comprises a permanent magnet with a pole gap, said permanent magnet being mounted in the normally stationary portion of said converter mechanism, an insulated coil of wire carried by said converter mechanism movable member which contacts said bearing race, said coil being freely movable in the pole gap of said permanent magnet, and wherein each of said indicating means includes an alternating current meter calibrated in terms of the average magnitude of the angular derivative of the radial displacements for the wave length band determined by its wave filter.

14. An instrument for rating the quality of anti-friction bearings having inner and outer races, which comprises means for supporting a bearing and rotatably mounting one of its races, means for rotating said supporting means at a substantially uniform speed, a converter mechanism which has a normally stationary portion, means for rigidly maintaining the axis of rotation of said race in fixed position relative to the normally stationary portion of said converter mechanism, said converter mechanism having a member in contact with the other race of said bearing, and restricted in its movement to motions substantially radial to said axis of rotation of said anti-friction bearing, means for varying the distance of said converter from said axis of rotation of said race, means for converting said radial motions of said moving converter member into corresponding electric voltages, said converting means comprising a permanent magnet with a pole gap, an insulated coil of wire freely movable in said pole gap, and a neutralizing coil connected in series opposition to said movable coil for substantially overcoming the effects of extraneous magnetic fields, said permanent magnet and said coil in said pole gap being movable relative to each other in accordance with movements of said converter mechanism movable member which contacts said bearing race, electric wave filters for dividing said electric voltages into at least two different bands of predetermined frequency ranges corresponding to predetermined ranges of wave lengths of the surface irregularities of the component parts of said anti-friction bearing, and an electric circuit means for indicating the output of each of said wave filters.

15. An instrument for rating the quality of anti-friction bearings having inner and outer races, which comprises means for supporting a bearing and rotatably mounting one of its races, means for rotating said supporting means at substantially uniform speed, a converter mechanism which has a normally stationary portion, means for rigidly maintaining said axis of rotation of said race in fixed position relative to the normally stationary portion of said converter mechanism, said converter mechanism having a member in contact with the other race of said bearing, and restricted in its movement to motions substantially radial to said axis of rotation of said anti-friction bearing, means for varying the distance of said converter from said axis of rotation of said race, means for converting said radial motions of said moving converter member into corresponding electric voltages, said converting means comprising a permanent magnet with a pole gap, an insulated coil of wire freely movable in said pole gap, and a neutralizing coil connected in series opposition to said movable coil for substantially overcoming the effects of extraneous magnetic fields, said permanent magnet and said coil in said pole gap being movable relative to each other in accordance with movements of said converter mechanism movable member which contacts said bearing race, electric wave filters for dividing said electric voltages into at least two different measurement bands of predetermined frequency ranges corresponding to predetermined ranges of wave lengths of the surface irregularities of the component parts of said anti-friction bearing, attenuator circuits for applying selected fractions of said converter output voltages to said measurement bands, an electric amplifier for each of said frequency bands, separate electric circuit means for indicating the output of each of said amplifiers, another electric amplifier connected to the output of said converter mechanism, and a loud speaker connected to said amplifier.

16. An instrument for rating the quality of anti-friction bearings having inner and outer races, which comprises means for supporting a bearing and rotatably mounting one of its races, a converter mechanism which has a normally stationary portion, a cartridge in which said bearing supporting means is rotatably mounted, means for removably holding said cartridge with the axis of rotation of said bearing supporting means held rigidly in fixed position relative to the normally stationary portion of said converter mechanism, said converter mechanism having a member in contact with the other race of said bearing, and restricted in its movement to motions substantially radial to said axis of rotation of said anti-friction bearing, means for varying the distance of said converter from said axis of rotation of said race, means for rotating said race supporting means at substantially uniform speed, means for converting said radial motions of said moving converter member into corresponding electric voltages, electric wave filters for dividing said electric voltages into at least two different bands of predetermined frequency ranges corresponding to predetermined ranges of wave lengths of the surface irregularities of the component parts of said anti-friction bearing, and an electric circuit means for indicating the output of each of said wave filters.

17. An instrument for rating the quality of anti-friction bearings having inner and outer races, which comprises means for supporting a bearing and rotatably mounting one of its races, a converter mechanism which has a normally stationary portion, a cartridge in which said bearing supporting means is rotatably mounted, means for removably holding said cartridge with the axis of rotation of said bearing supporting means held rigidly in fixed position relative to the normally stationary portion of said converter mechanism, said converter mechanism having a member in contact with the other race of said bearing, and restricted in its movement to motions substantially radial to said axis of rotation of said anti-friction bearing, means for varying the distance of said converter from said axis of rotation of said race, means for rotating said race supporting means at substantially uniform speed, means for converting said radial motions of said moving converter member into corresponding electric voltages, electric wave filters for dividing said electric voltages into at least two different measurement bands of predetermined frequency ranges corresponding to predetermined ranges of wave lengths of the surface irregularities of the component parts of said anti-friction bearing, attenuator circuits for applying selected fractions of said converter output voltages to said measurement bands, an electric amplifier for each of said measurement bands, separate electric circuit means for indicating the output of each of said amplifiers, another electric amplifier connected to the output of said converter mechanism, and a loud speaker connected to said amplifier.

ERNEST J. ABBOTT.
LUCIAN W. CHANEY.
EDWARD B. BRAGG.

REFERENCES CITED

The following references are of record in the file of this patent:

UNITED STATES PATENTS

| Number | Name | Date |
|---|---|---|
| 1,690,279 | Craft | Nov. 6, 1928 |
| 1,955,812 | Keller | Apr. 24, 1934 |
| 1,981,693 | Firestone et al. | Nov. 20, 1934 |
| 2,009,997 | Germond | Aug. 6, 1935 |
| 2,105,167 | Sinnett et al. | Jan. 11, 1938 |
| 2,184,565 | Pesce | Dec. 26, 1939 |
| 2,338,293 | Martin | Jan. 4, 1944 |
| 2,340,714 | Traver et al. | Feb. 1, 1944 |

FOREIGN PATENTS

| Number | Country | Date |
|---|---|---|
| 645,132 | Germany | May 21, 1937 |